(No Model.) 5 Sheets—Sheet 1.

J. M. WILLIAMS.
MACHINE FOR SEPARATING METALS AND MINERALS.

No. 316,211. Patented Apr. 21, 1885.

Witnesses:
John Buckler,
Henry Sieb

John M. Williams,
Inventor.
By Worth Osgood
Attorney.

(No Model.) 5 Sheets—Sheet 3.

J. M. WILLIAMS.
MACHINE FOR SEPARATING METALS AND MINERALS.

No. 316,211. Patented Apr. 21, 1885.

(No Model.) 5 Sheets—Sheet 4.

J. M. WILLIAMS.
MACHINE FOR SEPARATING METALS AND MINERALS.

No. 316,211. Patented Apr. 21, 1885.

Witnesses:
John Buckler.
Henry Sieb.

John M. Williams,
Inventor,
By Worth Osgood
Attorney.

(No Model.) 5 Sheets—Sheet 5.

J. M. WILLIAMS.
MACHINE FOR SEPARATING METALS AND MINERALS.

No. 316,211. Patented Apr. 21, 1885.

Witnesses:
John Buckler,
Henry Fieb.

J. M. Williams,
Inventor.
By Worth Osgood,
Attorney.

UNITED STATES PATENT OFFICE.

JOHN M. WILLIAMS, OF SALEM, NEW YORK.

MACHINE FOR SEPARATING METALS AND MINERALS.

SPECIFICATION forming part of Letters Patent No. 316,211, dated April 21, 1885.

Application filed February 21, 1883. (No model.)

*To all whom it may concern:*

Be it known that I, JOHN M. WILLIAMS, of Salem, county of Washington, and State of New York, have invented certain new and useful Improvements in Machines for Separating Metals and Minerals, of which the following is a full, clear, and exact description, reference being had to the accompanying drawings, and to the letters of reference marked thereon.

My invention has relation to apparatus for effecting the separation of particles of metals and mineral substances from the matrix, rock or gangue matter accompanying them, and also for the separation from one another of metals and mineral substances having different degrees of specific gravity.

The objects of my invention are to effect a more rapid, certain, and complete separation of the metallic particles than by any methods heretofore known to me, to gather or collect the particles so separated in like advantageous manners, to deliver the separated mass more free from foreign substances than heretofore, and to provide a simple, strong, and durable apparatus with which the operations are to be effected, the same being easily operated and readily adjusted, as may be required to suit its work to any class of material, requiring little power for its operation, and but little attention from the operator after having been once adjusted. To accomplish these objects my improvements involve certain novel and useful relative arrangements or combinations of parts, peculiarities of construction, details of manufacture, and principles of operation in the machine or apparatus, all of which will be herein first fully described, and then pointed out in the claims.

In the accompanying drawings, forming part of this specification.

In all these figures like letters of reference, wherever they occur, indicate corresponding parts.

The machine is mounted upon a frame or base, B, to which standards S S are bolted at each side, and on which is an elevating-screw, L, at one end, all of which support a heavy triangular-shaped frame, A, its sides being sustained by circular projections or hubs cast upon the standards S S, which hubs are turned to enter perforations in the sides of the frame A, so that the end of the frame may be raised or depressed by turning the elevating-screw L through the medium of its hand-wheel or equivalent lever, the frame being attached to the screw L, which retains it at any desired elevation.

The hubs or projections on the standards are annular in form or hollow, and through their centers passes a shaft, H, smaller than the holes in the hubs, and resting in bearings formed in each standard immediately outside of the said hubs. The shaft H carries on one end a multiple cam-wheel, C, and on the other a tight and a loose pulley, as C' C², by means of which motion is transmitted to the machine. This shaft also has attached to it at the center of the frame A a single cam, K. The shaft H, being concentric with the hubs, permits the movement of the frame A without interference with the proper working of either the cam K or the cam-wheel C and its accompanying roller Q.

Figure 4:
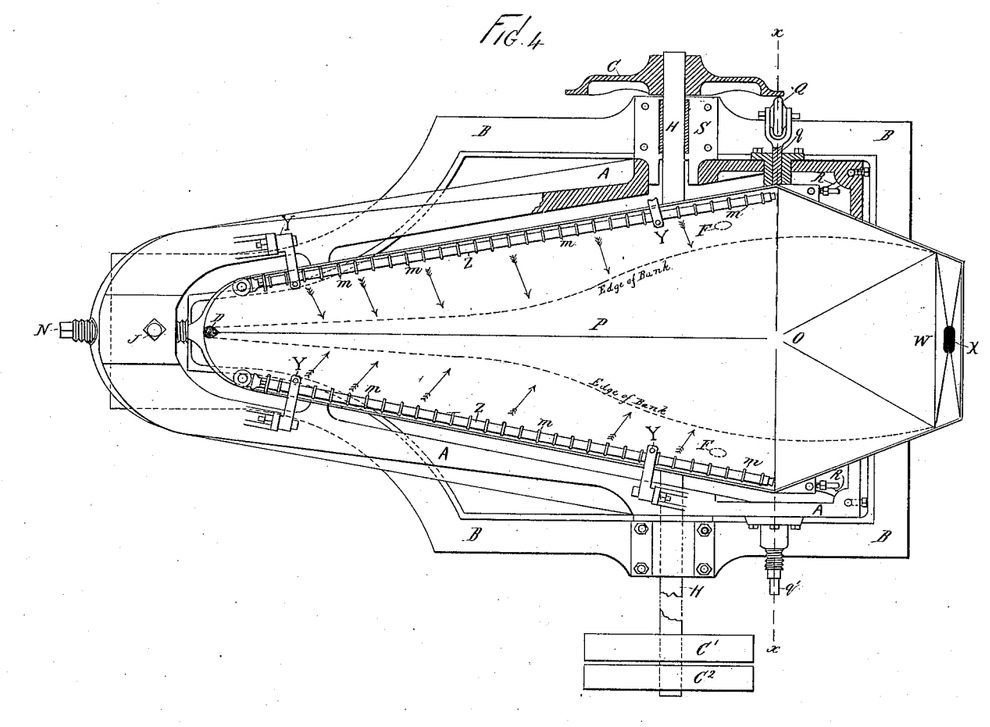
Fig. 4 is a plan or top view of the apparatus shown in Fig. 1, a portion being represented in section.
Figure 5:
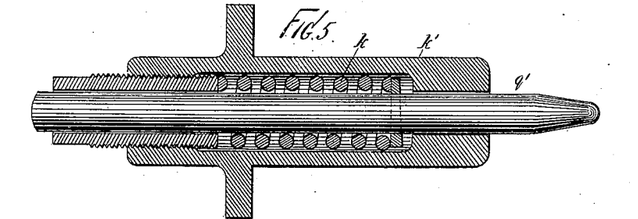
Fig. 5 is a sectional view on a larger scale, showing the construction and arrangement of the transverse spring-case and bar.
Figure 6:
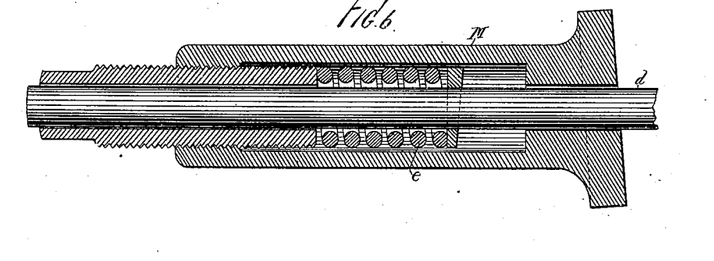
Fig. 6 is a similar view of the longitudinal spring-case and bar.
Figure 7:
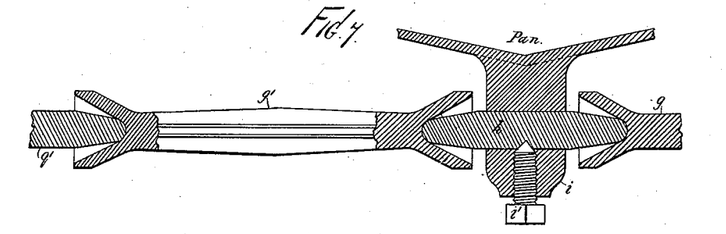
Fig. 7, a sectional elevation showing the central lug and pin and the socketed connecting-arm, and Fig. 8 a sectional elevation showing the construction of the roller and its connections and mountings.
Figure 17:
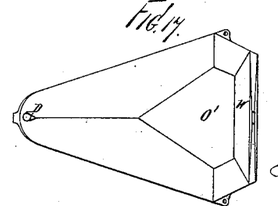

The vibrating pan, table, or trough P is in its general form triangular—that is to say, wider at the lower end than at the upper, and longer than wide—made up of three or more plane or curved surfaces meeting each other at two or more of each of their edges in such manner that each surface is at an angle with each adjoining surface in contact with it, thus making a point of deepest depression, as at O, Fig. 4, all of the surfaces sloping upward from the bottom to the extreme edges of the pan or table. Instead of plane surfaces, the pan may be formed of curves so combined and worked together as to form a pan similar in general form and proportion, but without the distinct lines of intersection between the adjacent sides, as in the case of plane surfaces. At Fig. 17 is shown a pan in which the side planes are joined with a flat bottom, O', of limited area, indicating that it is not necessary to have the planes meet in a single point. The pan shown in Fig. 4 is composed of five plane surfaces, three of which are triangular and two quadrilateral in form, with one corner of each of the latter two rounded off near the narrow end of the pan and formed into a rounded projection or buffer at the center. The pan or table, P is surrounded by a narrow rim or guard, $p$, to prevent the slopping of water from it, except at the lower end, W, where it is provided with an extension of hopper-like form so arranged as to catch the waste material flowing over the lower edge, W, and pass it down through the opening X. The pan is also provided at the narrow end with a discharge-opening through the bottom at the intersection of the two longitudinal inclined sides or surfaces and the end of the pan inside of the buffer, as shown at D, for the discharge of cleaned product. This pan is suspended from the frame A by three spring-hangers, two of which are attached to the pan near the corners at its widest part, and marked R R in drawings, the third being arranged to support the narrow end of the pan, as shown at T. This last-named hanger is constructed from a thin flat piece of iron or steel bent into the form of a U or W, the end next to the under side of the pan being turned over and formed into an eye or pin-hole, and retained between two lugs, as at $b$, formed on the under side of the pan, with holes corresponding with the hole or eye in the hanger end, through all of which passes a pin or bolt, thus attaching that end of the hanger to the pan, not rigidly, but with a chance for movement on the pin. The other end of this hanger is secured to a cross-piece, $c$, forming a part of or attached to the frame A by bolts or otherwise. Through this cross-piece passes loosely a rod, $d$, projecting so far as to bear against the longer arm of the hanger T. This rod is thrown forward by means of an adjustable spring, $e$, inclosed in the spring-case M, which rod, acting through the hanger T, throws the pan P against the percussion-screw N at the buffer end. This screw is tapped through a hole in the end of the frame A, and by being advanced or withdrawn determines the length of travel or stroke of the pan P. This percussion-screw N is retained in its position by a binding-screw, J, having under it a short cylinder of soft brass, $j$, one end of which is threaded to correspond with the thread of the percussion-screw, thus preventing injury to the latter and permitting of its ready release for adjustment. A similar binding-screw may be applied to the elevating-screw L.

Figure 1:
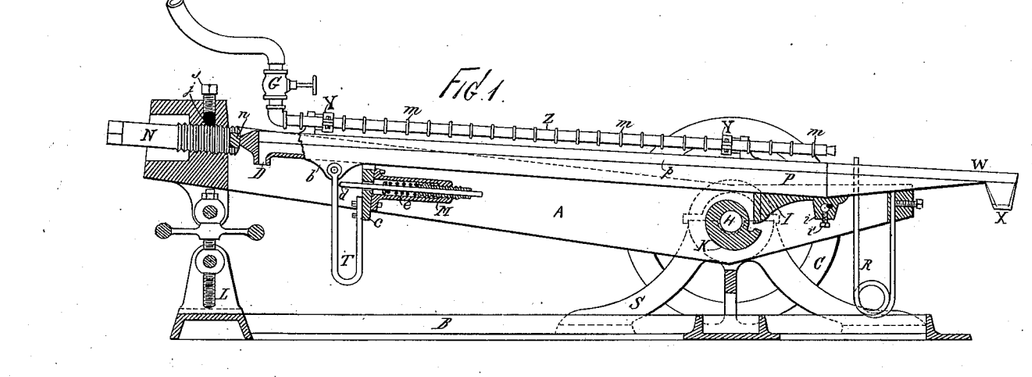
Figure 1 is a vertical longitudinal section and partial elevation of an apparatus constructed and arranged for operation in accordance with my invention.
Figure 2:
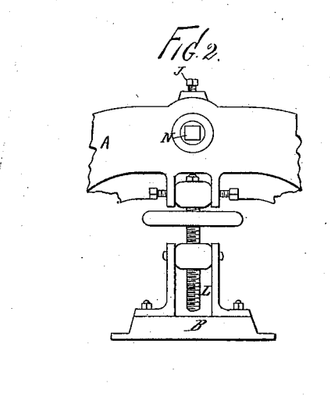
Fig. 2 is an end elevation showing the position and connections of the elevating-screw.
Figure 3:
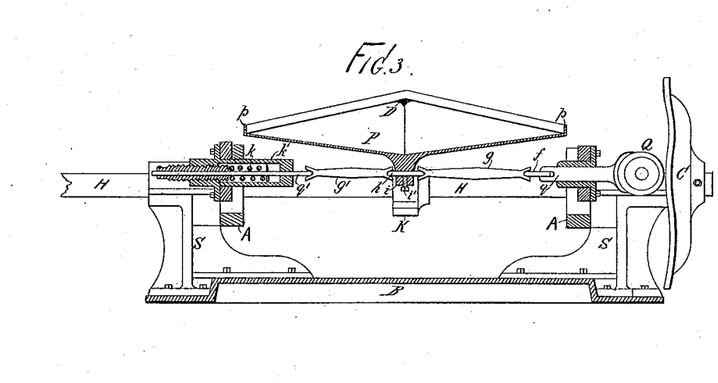
Fig. 3 is a cross-section and partial elevation on a plane passing through line *x x* of Fig. 4.

The two spring-hangers R R are constructed from small round bar iron or steel bent in U, W, or single-coil form, as shown in Fig. 1, one end of each passing through a hole in a lug formed on each corner of the pan at its widest part, the other end of each passing through similar holes near the corners of the wide part of the frame A. Set-screws tapped into the lugs on the pan and through the sides of the frame press upon the hanger-rods in the holes, binding them securely in their places and permitting of their ready adjustment up or down to bring the wide end of the pan to a level position transversely. These attachments might be otherwise constructed.

Figure 8:
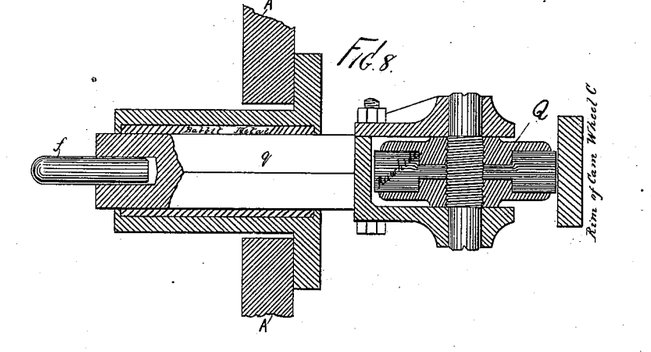
Figure 9:
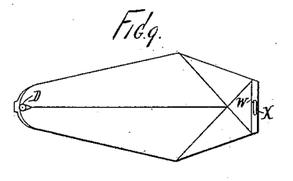
Figs. 9, 10, 11, 12, 13, 14, 15, 16, and 17 are plan views showing some of the numerous forms which may be given the inclined portion or bottom plates of the movable pan, all within the limits of my invention.
Figure 10:
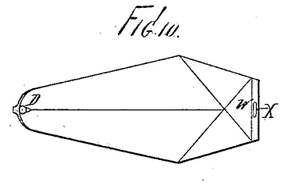
Figure 11:
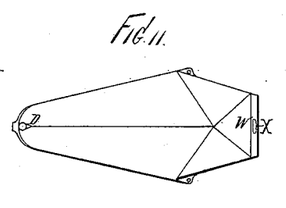
Figure 12:
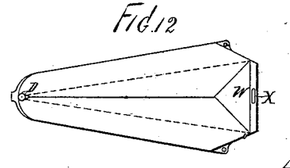
Figure 13:
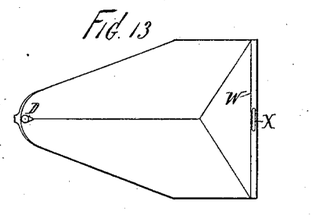
Figure 14:
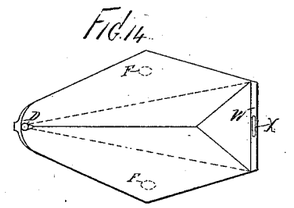
Figure 15:
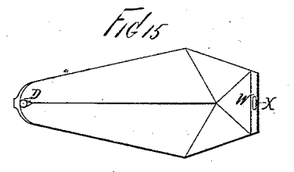
Figure 16:
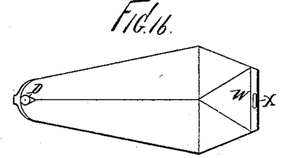

Through an opening in the side of the frame A at a point opposite to the eccentric rim of the cam-wheel C is bolted a circular flanged guide-piece, through which passes a sliding bar, $q$, carrying on its outer end a roller or wheel, Q, with a surface formed of rawhide, leather, or similar substance, substantially as represented in Fig. 8, the sliding bar being free to move in and out, so as to keep the roller Q in contact with the rim of the cam-wheel and permit it to follow the eccentricity of the rim.

At the inner end of the sliding bar is inserted a steel pin, $f$, with a rounded end, this rounded end entering into the concave end of a connection, $g$, extending underneath and nearly to the center of the pan P, where, in a similar concavity in that end, it receives the rounded end of another steel pin, $h$, which passes through a hole in a lug, $i$, extending downward from the bottom of the pan P. This latter pin is firmly secured in the hole through the lug by a strong set-screw, $i'$, and has another rounded end on the opposite side of the lug, where it enters another concave-ended connection, $g'$, similar to the first described, whose opposite end engages with the rounded end of another sliding bar, $q'$, which passes through the opposite side of the frame A, which bar is thrown forward against the end of the connection by an adjustable spring, $k$, in a spring-case, $k'$, attached to that side of the frame A. The pressure of this spring, transmitted through the sliding bars, the connections, and the pins, keeps the roller Q in contact with the cam-wheel C and compels it to follow the eccentricities of its rim, producing a reciprocating movement, which is transmitted to the pan P through the center pin secured in the lug projecting from the bottom of the pan, this transverse reciprocating movement being by this arrangement effected without rattle or jar, all lost motion and wear being taken up by the tension of the spring keeping all the parts in constant contact during the entire stroke or distance of travel in both directions, this stroke or distance being regulated, as well as the number and rapidity of the movements, by the substitution upon the shaft H of cam-wheels having different numbers of undulations and of various extent formed upon their rims. This transverse movement is also produced in such manner as not to interfere with the other motions of the pan by reason of the peculiar arrangement of the hangers, sliding bars, pins, and connections before described.

At a little distance back of the lug $i$ is another lug or tappet, I, extending downward from the bottom of the pan as far as the center line of the shaft H, and in proper position to be acted upon by cam K, so that by the revolution of the shaft H, the cam being held in contact with the tappet I by the pressure of the spring $e$, the pan is carried forward until the point of the cam disengages from the tappet, when the force of the spring $e$ carries the pan rapidly back into contact with the percussion-screw N, thereby suddenly arresting its motion. Meanwhile, by the same revolution of the shaft H, the cam-wheel C is carried around once, thereby imparting, through the roller Q and its connections before described, as many transverse reciprocating movements to the pan as there are undulations on the rim of the cam-wheel. These movements and the actions therefrom give rise to the term "longitudinal percussion vibrating pan," by which the improved apparatus is distinguished.

In the end of the percussion-screw N is inserted a piece of rawhide, leather, or similar substance, $n$, to prevent the injurious effects which would arise from the striking together of metallic parts, the rawhide receiving the blow given by the projection or buffer on the narrow end of the pan before described.

Upon the sides of the frame A are attached lugs with articulated arms Y Y, which support pipes Z Z upon each side of the frame, so that they overhang the upper edges of the inclined quadrilateral sides of the pan P. These pipes have small perforations or holes made in a line throughout their entire length for the discharge of jets of water upon the pan, the lower ends of these pipes being closed by a removable plug or stopper to facilitate cleansing, the other ends having valves or cocks, as at G, attached to regulate the supply of water entering the pipes and to control the force of its delivery. Beyond the cocks rubber tubing is attached so as to connect with a water-supply in such manner as to permit of the movement of the pipes and the frame A for adjustment. The ends of the arms Y Y are formed into rings bored to admit the pipes Z Z easily, and are split on one side and furnished with binding-screws, so as to firmly grip the pipes and hold them securely when in proper position. By slackening the screws the pipes may be partially revolved in the rings, so as to direct the jets of water issuing from the lines of the perforations in the pipes at the desired angle upon the inclined sides of the pan P.

Short sections of rubber tubing, forming rings (shown at $m\ m$) just large enough to slip upon the pipes, are placed near each perforation, so that by sliding the ring over the hole the jet issuing therefrom may be stopped at will, thus making the number of jets thrown upon the pan readily adjustable.

By manipulating the valves at the ends of each pipe the amount and force of the water issuing from the perforations may be controlled and adjusted also.

From the above description it will be seen that the machine is so constructed and arranged that by one revolution of the driving-pulley the vibrating pan will make one stroke in a longitudinal direction, said stroke being arrested suddenly at its upper end, the length of such stroke being regulated by the position of the percussion-screw N, and its force by the tension of the spring $e$, both of which are adjustable at will; also that during each longitudinal stroke the pan will make as many transverse movements and those of as great extent as may be determined by the cam-wheel C, which movements may also be varied at pleasure by the substitution of different wheels. It will also be seen that the pitch or inclination of the pan longitudinally may be varied at all times by the elevating-screw L and its hand-wheel, and that the height of either side of the pan may be adjusted by the spring-hangers and their set-screws, and, finally, that the amount, direction, and force of the supply of water brought upon the pan may be controlled at will and to suit the requirements of the different qualities and classes of material to be operated upon by the machine.

One construction of roller Q is indicated in Fig. 8, wherein the rawhide is shown as clamped between two disks. This figure also indicates one construction of the bearing for the sliding bar on which the roller is mounted, said bearing being provided with an antifriction lining—such as Babbitt metal or the like—calculated to obviate wear and reduce friction.

Figure 18:
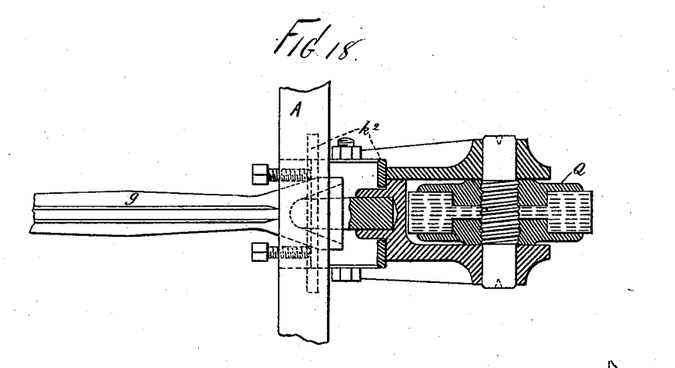
Fig. 18 is a partial plan and horizontal section, and Fig. 19 a side elevation illustrating a modified form of spring for holding the roller in contact with the surface of the cam-wheel.
Figure 19:
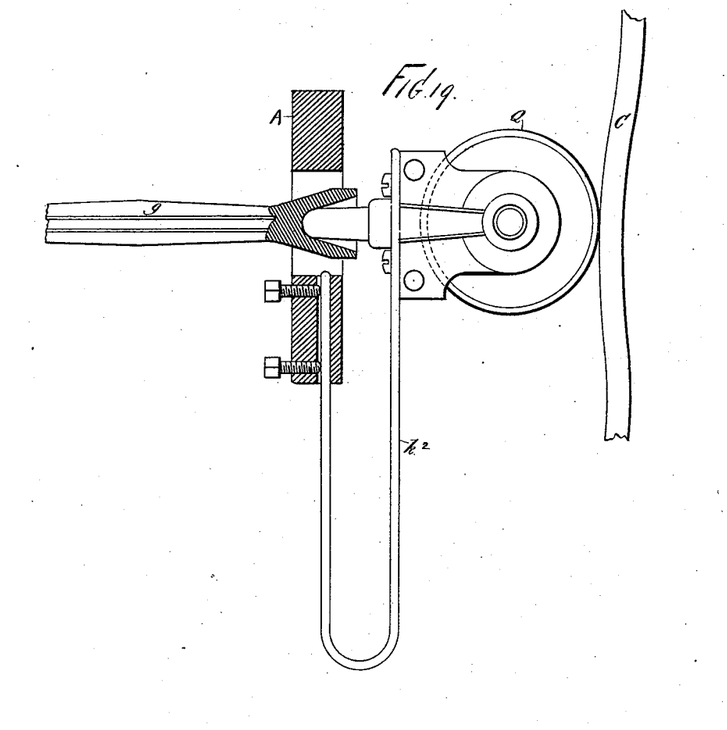

Instead of the sliding bar to support the roller, I may employ a broad, flat spring-hanger, (like the one under the narrow end of the pan.) The roller being attached to one end of this spring, of which the other end is connected with the frame, a simple pin or projection on the back of the spring will answer to engage with the concave end of the connection, the same as the rounded end of the pin in the roller-hanger. The office of the spring is only to support the roller, and it will work well without wear, without requiring to be oiled, and with very little friction. This modification is well represented in Figs. 18 and 19, wherein $K^2$ is the bent spring.

Figs. 9 to 17, inclusive, show various forms and proportions which may be given the plates composing the bottom of the pan, and still preserve its general triangular form and outline, in order that it may accomplish the work intended and in the manner intended. Other forms might be given these plates; but enough has been shown to indicate that the operation of the machine is not dependent on any particular form and the invention not intended to be limited thereby.

It will be observed that the arrangement of shaft H in the center of the hubs permits frame A to be raised or lowered by the elevating-screw without interfering with the operations of cam K or cam-wheel C, all being movable about the axis of shaft H; also that the transverse and longitudinal motions do not interfere with each other, as the cam K slides across the face of the tappet to accommodate the transverse movement.

The tension of spring $e$ in the form shown in the drawings is made adjustable by means of a hollow screw-threaded bolt encircling the rod $d$, and similar means are shown for regulating the tension of spring $k$.

Such being the construction of the machine, it is operated as follows: Power is applied from any suitable source to turn the shaft H. The rock or ore containing the metals or minerals in a finely-divided state interspersed throughout its mass, having been reduced by appropriate pulverizing machinery to such a degree of comminution as to free the metallic particles from the surrounding and adherent gangue, is fed with a suitable amount of water to carry it through a trough or launder to a point near the center of the converging sides or surfaces of the pan or table, as at O, Fig. 4. The pan having been adjusted by its supporting parts so that its discharging end D is at the proper height, and the line of intersection of the longitudinal inclined sides is at a proper inclination from a horizontal position to suit the material to be operated upon, the ore and water coming upon the pan through the launder form a mass or pool in the center of the pan, increasing in extent and depth until it reaches to a height sufficient to cause the water and lighter particles of the material to flow over the edge of the lower inclined end of the pan at W. The transverse reciprocating motion, meanwhile acting upon the material in the pan, causes the mass of ore and water to distribute evenly, keeps its surface smooth and level, prevents the rush and flow of water from forming courses and channels in the surface of the mass, effects the delivery of the water and light waste material in a thin, even stream or flow over the lower edge of the pan at W, and agitates and keeps in motion the particles forming the mass in the lower part of the pan, so that those having the greater specific gravity settle toward the bottom of the mass and center of the pan. The longitudinal motion of the pan, by its sudden check or stop at the end of the stroke toward the discharge D, has the effect of causing the mass or bank of material to move up the incline and toward the discharge end D; but the slope of the pan and the currents of water flowing down its inclined longitudinal sides against the edges of the mass both tend to carry it back. The force of the currents of water, being greatest on the surface of the mass, has the most effect upon the lighter particles of material which are there exposed, and carries them on the surface of the mass a greater distance down the pan toward the waste end, while the heavier particles at the bottom of the mass receive the greatest effect from the longitudinal motion of the pan (they being in contact with its surface) and the less effect from the flow of the water, (which is retarded by friction with the surface of the pan at that point,) and are carried farther up the line of intersection of the two longitudinal inclined sides of the pan and nearer to the discharge D by each longitudinal stroke or movement of the pan. As the ore is continuously fed into the pan through the launder, and the lighter portions are continually washed from the surface and lower end over the waste end of the pan, a mass or bank of the heavier particles gradually collects above the center of the pan, and by its superior inertia and the action of the longitudinal motion forces its way upward toward the discharge D, and against the inclination of the pan and the forces of the water-currents descending the inclined sides of the pan, being continually backed up by the addition and accumulation of new incoming heavy particles in the rear from the launder, until the upper end of the heavy mass reaches the discharge in the upper end of the pan and is ejected therefrom into a convenient receptacle, so that the inclination of the pan, the extent and force of the longitudinal motion, and the supply of water being suitably regulated to meet the requirements of the particular mixture of materials being operated upon, the discharge of cleaned product will be continuous and as rapid as the supply coming into the pan through the launder will permit.

The mass or bank of material in the pan assumes an outline at its surface of a triangular form, due partly to the shape of the particular pan in use and partly to the inclination at which it is set. It is at the edges of this triangular mass or bank, narrowing in width as it extends up the pan between the inclined sides, that the main operation of the apparatus in cleaning the lighter from the heavier particles is effected. As the mass or bank of material decreases in width and depth as it reaches up the incline of the pan, it gives a better and better opportunity for the side currents of water impinging upon its edges to act upon it and thoroughly wash out and carry off the lighter particles, consisting, usually, of rock or gangue matter, the mass or bank being moved and thrown up obliquely or at an angle to the direction of the descending water on the sides of pan at each longitudinal stroke.

The angle at which the side currents meet the edges of the bank of material is a peculiar feature in the operation of the machine and contributes to its successful operation. This angle can be varied somewhat by the inclination given to the pan by the elevating-screw, but in a greater degree by the shape and proportions which are given to the pan itself, which must be governed and decided by the nature and conditions of the material to be operated upon in each case, it being found as a general rule that material holding a large percentage of heavy particles will require broad and shallow pans or tables, while in the opposite case the pans may be narrow and of greater proportionate depth. This angle must in all cases be so adjusted that the currents of water are neither directly opposed to the movement of the mass or bank in the pan, thereby too much retarding its progress upward and diminishing the performance of the machine, as well as risking a loss of the finer particles of the heavier portion, nor directly at right angles to the movement of the bank up the pan, thereby permitting the lighter portions of the material too easily to escape the action of the currents of water and be propelled by the longitudinal motion too quickly to the discharge D, thereby allowing some of the lighter particles to be discharged with the heavier, thus rendering the product unclean and imperfect. This angle should be so arranged, (in order that the machine may work to its best advantage,) both by the shape and proportions of the pan and its inclination, that the currents of water shall meet the edges of the bank of material at such a degree of obliquity as to most perfectly wash or carry the lighter particles on the surface of the mass toward the center line of the pan, and at the same time somewhat downward toward the waste end W, while at the same time permitting the heavy particles underneath, which are more influenced by the longitudinal motion by reason of their greater inertia and close proximity to the surface of the pan, to move upward past the flow of the currents and toward the discharge D.

The approach and meeting of the currents of water from the inclined sides of the pan, near its upper end, have the effect of working over and thoroughly exposing the narrowing bank of partially-cleaned material advancing upward at every stroke, while the combined longitudinal and transverse motions have the effect of so agitating and moving the heavier particles among themselves that the smaller and therefore lighter of these are worked down between the larger ones to the surface of the pan, and are thus protected from the too severe action of the water-currents by the larger particles above them, which receive and break the force of the streams, thus permitting the finer heavy particles to be carried along upward under the large ones and on or near to the surface of the pan, near the intersection of its longitudinal inclined sides, to the discharge-hole at the upper end of the pan.

The peculiar triangular form of the pan also prevents loss from the flowing off of small particles of mineral, it being such that its gradually-increasing width toward its lower end tends to weaken the force of the flow of water down the surface of the mass, so that should a fine particle be thrown up and floated off at the edge of the bank of material it is only carried a short distance down the pan and dropped again in the mass, (the weakening flow being insufficient to bear it farther,) when it is worked under again by the rapid reciprocating motion and settles to the bottom of the mass, to be again subjected to the action of longitudinal movement and carried toward the discharge D.

The character and extent of the motions of the pan have much influence on its performance, and must be regulated to suit the exigencies of the material to be operated upon. As a rule, the greater the percentage of heavy matter the greater and more rapid the movements should be; this more especially in regard to the transverse motion.

The possibility of effecting variations in the transverse movements of the pan by the substitution of differently-formed cam-wheels C renders a machine with a pan of medium form and proportions available for quite an extended range of difference in the character and condition of the materials to be worked upon it, so that it will only be in cases of extreme variations in the materials that the proportions of the pan itself must be changed to meet the requirements of the case. In certain cases it may be found desirable to divide the stream of water and material fed to the pan into two equal parts, directing each part by a launder upon one of each of the longitudinal inclined sides of the pan near its widest part, and above the edges of the mass of material in the center, as at the points marked F F, Fig. 4, so that the feed shall fall into the water-currents descending the inclined sides, and be carried by them into the mass in the pan, a partial separation of the heavier and lighter particles taking place during their descent in the currents, thus assisting in the general result.

It will also be found desirable in working certain classes of ores, particularly those carrying portions of very light mineral substances liable to float on the surface and be carried off by the currents of water, to place in and fill up the central portion of the pan with balls or irregularly-shaped pieces of metal or other heavy substances of considerable size, so that portions of the same shall project above the surface of the water and material to be worked in the pan for the purpose of interrupting and deflecting any direct currents over the surface toward the overflow, and thus render it more difficult for light material to be carried away, and also by the continual movement and change in position among the balls or other pieces produced by the motions of the pan to facilitate the settling down between them of particles of mineral to the bottom of the mass in the pan. In case such balls or pieces are used, a retaining-bar or grating must be placed across the overflow end of the pan in such manner as to retain the balls or other pieces, while permitting the finer material being operated upon to escape.

Should it be desired to use quicksilver to collect the gold or silver contents of an ore, the quicksilver may be placed in the pan to such a depth that none will escape at the overflow end, the pan being otherwise operated as usual. The quicksilver, being in the most advantageous position to come in contact with the heaviest sportion of the mass in the pan, will unite with any gold or silver that may be in condition to amalgamate, while other portions of the same metals that may be in a rusty condition or coated with repellent substances will be discharged with other mineral portions of the ore of great specific gravity at the upper end of the pan, as usual.

The great range of adjustability of the different motions of the pan, of its inclination, and of the force, direction, and quantity of the water supplied to it, as well as the peculiarity of its action, renders it possible to operate successfully upon material varying considerably in the size of its particles, rendering unnecessary that careful classification by sieves, trommels, or other sizing apparatus usually required by other machines. It also makes it possible to deliver an almost absolutely clean product at one operation of the machine, ready for the smelting-furnace or other process of further beneficiation.

Having now fully described my invention, what I claim as new, and desire to secure by Letters Patent, is—

1. The herein-described concave pan, table, or trough, having inclined sides and end for receiving the material, and an adjustable frame, combined with a cam, tappet, spring-actuated piston or bar, and adjustable stop-screw or plug arranged to communicate an intermittent longitudinal movement to the pan, and to suddenly arrest the motion thereof, substantially as and for the purposes set forth.

2. In combination with the adjustable frame mounted in trunnions on the main frame or support, the concave pan, table, or trough, and the spring-hangers, each having one end connected with the pan and the other with the adjustable frame, substantially as and for the purposes set forth.

3. In combination with the movable pan, the driven shaft carrying a multiple cam-wheel, a roller supported on a sliding bar and arranged to bear against said wheel, the pins, movable connections, and adjustable spring and rod arranged to communicate transverse movements to the pan and to regulate and determine said movements, substantially as and for the purposes set forth.

4. In combination with the concave pan, trough, or table, an adjustable frame supporting the same, a friction-roller, multiple cam-wheel, adjustable spring, and intermediate articulated connections, whereby longitudinal movement and adjustment of the pan are permitted without interfering with the transverse movements, substantially as and for the purposes set forth.

5. In combination with the longitudinally-movable percussion-pan mounted in the adjustable frame, the spring-actuated piston or sliding bar, made adjustable as explained, and mounted in a casing connected with said frame, whereby the pan is thrown forward and the force of stroke thereof regulated, substantially as and for the purposes set forth.

6. The spring-actuated piston or sliding bar mounted in a casing supported upon the adjustable frame, the regulating-screw for adjusting the tension of the piston-spring, and the movable pan connected with the frame by spring-hangers, the piston being arranged to bear against the forward hanger, these parts being arranged or combined substantially as shown, and for the purposes set forth.

7. In combination with the movable pan, the adjustable frame supporting the same, the main frame, and the adjustable percussion-screw located on the main frame and in the path of the pan, substantially as and for the purposes set forth.

8. In combination with the pan-supporting frame, the herein-described percussion-screw provided with the elastic cushion and binding-screw, said percussion-screw being located in the path of the movable pan, whereby the movements of said pan and its length of stroke are determined, substantially in the manner and for the purposes set forth.

9. The movable water-pipes supported on each side of the pan by the adjustable arms, substantially as shown, said pipes being perforated and provided with movable elastic rings to govern the flow of water through the perforations, and with cocks or valves regulating the force of the water-supply, these parts being arranged or combined substantially as and for the purposes set forth.

10. The movable pan, table, or trough, the adjustable frame, the yielding connections uniting the two, the power-driven shaft mounted in annular hubs or trunnions and carrying the cam and cam-wheel, the tappet applied upon the pan, the articulated connections and adjustable spring, the spring-actuated piston or bar, and the percussion screw or plug, all combined and arranged for operation substantially as and for the purposes explained.

In testimony that I claim the foregoing I have hereunto set my hand in the presence of two witnesses.

JOHN M. WILLIAMS.

Witnesses:
RUFUS HALE,
CHAS. L. DAVIS.